May 23, 1944.  O. T. FRANCIS  2,349,715
RADIANT ENERGY CONTROL DEVICE
Filed May 20, 1941  2 Sheets-Sheet 1

Inventor
Oliver T. Francis

May 23, 1944.  O. T. FRANCIS  2,349,715

RADIANT ENERGY CONTROL DEVICE

Filed May 20, 1941  2 Sheets-Sheet 2

Inventor
Oliver T. Francis

Patented May 23, 1944

2,349,715

UNITED STATES PATENT OFFICE 2,349,715

RADIANT ENERGY CONTROL DEVICE

Oliver T. Francis, Renville, Minn.

Application May 20, 1941, Serial No. 394,389

22 Claims. (Cl. 250—41.5)

This invention relates to radiant energy control devices, and more particularly to a means of receiving far infra red, or heat radiations.

This invention is a continuation in part of application Ser. No. 281,964, filed in the U. S. Patent Office June 29, 1939 for "Infra red control device." In that application I illustrated a receiving means comprising, means for impressing photons in the far infra red on an adsorbent over which a stream of gas was passing to modulate said gas stream in accordance with the number of said photons impressed on said adsorbent. The means for indicating the modulation of said gas stream consisted in a manometric flame combined with photoelectric means for indicating changes in said flame. The particular gases utilized in that application consisted in wood alcohol vapors, and oxygen combined with an inert gas such as helium or nitrogen of the air. While the dynamic response of that device was satisfactory, it was not as sensitive to weak sources of radiant energy as was desired.

It is an object of this invention to illustrate a device capable not only of high dynamic response but of high sensitivity to far infra red radiations as well.

A further object is to illustrate a photoelectric circuit which shall be very sensitive to small changes in received radiant energy in the visible and near visible portion of the spectrum.

It is well known that the current through a high vacuum photo cell is substantially independent of anode to cathode drop across said cell. It has been possible to measure extremely small variations in intensity of light received by utilizing an ohmic resistance load of the order of a hundred million ohms for a photoelectric cell. As said cell is subject to a considerable steady component of light it loses its sensitivity to small variations of light intensity due to the fact that experimenters have been unable to maintain a load of high A. C. impedance as the D. C. current through said cell greatly increases. It is an object of this invention to illustrate a photoelectric cell load whose D. C. impedance shall vary with the steady component of light received by said cell but whose A. C. impedance shall remain extremely high.

Another object is to illustrate a high A. C. impedance photoelectric cell load comprising a saturated electron emitting element and means for varying the saturation value of said emitting element in accordance with the D. C. component of light impressed on said cell, or the D. C. current flowing in the circuit of which said emitting element is load.

Another object is to illustrate a high impedance vacuum tube amplifier load wherein the D. C. impedance of load shall decrease with increased D. C. voltage impressed on said load, but where the A. C. impedance of said load shall remain high.

Another object is to provide a container transparent to far infra red radiations inclosing an element sensitive to said radiations, said container being made of Cellophane.

Another object is to illustrate a device wherein molecules of acetylene are released from an adsorbent by impressing radiant energy photons on said adsorbent and means for indicating the amount of said gas released.

Another object is to modulate a stream of smoke in accordance with variations in gas released from an adsorbent subjected to far infra red photons, means for modulating a beam of light in accordance with said modulated smoke stream, means for modulating an electrical current in accordance with said modulated light beam, and means responsive to said amplified electrical current.

Another object is to illustrate how an inductive reactance load may be increased by placing said reactance in the input and output circuit of a vacuum tube, and means for decreasing the D. C. impedance of said vacuum tube as the steady component of the space current in said tube increases.

With these and other objects in view the invention will best be understood by reference to the following drawings wherein.

Figure 1:
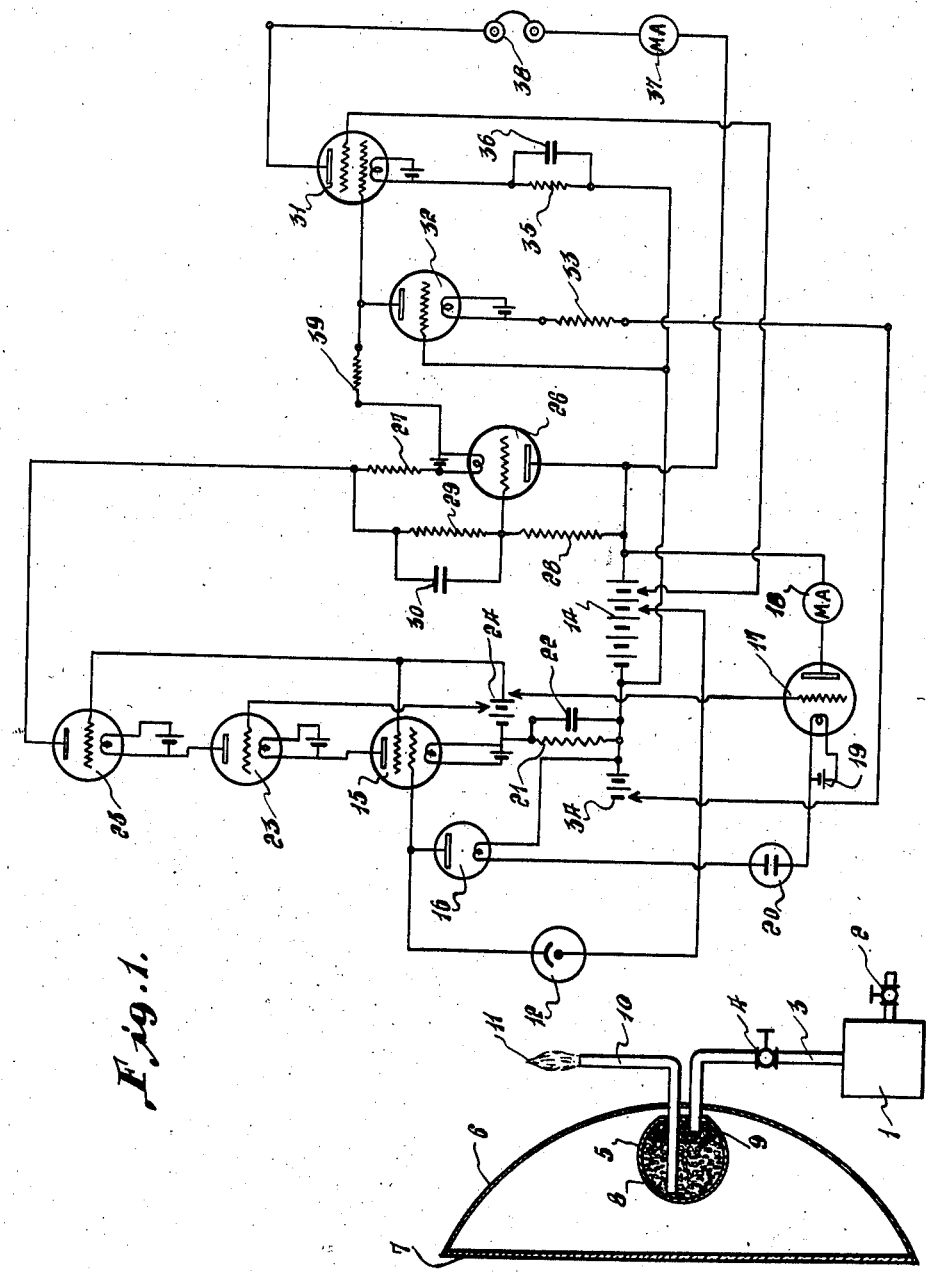
Fig. 1 is a schematic drawing of my far infra red detector using a manometric flame.

Referring to Fig. 1, I is a container of gas as for example acetylene, which may be recharged from time to time through valve 2. A tube 3 connects container 1, with heat sensitive element 5 located at the focal point of a parabolic reflector 6. Valve 4 regulates the gas flow through tube 3. The envelope of element 5 is made of a substance transparent to heat radiations. I have discovered that ordinary Cellophane is highly transparent to radiations between three and six microns, and the envelope of element 5 may therefore be made of this substance. Across the front of parabolic reflector 6 is a sheet of Cellophane 7, to keep air currents from element 5.

Heat sensitive element 5 consists of adsorbent particles for adsorbing gas from container 1. Where acetylene is used charcoal particles 8 and cotton 9 saturated with acetone has proved satisfactory. A tube 10 connects heat sensitive element 5 to manometric flame 11. Tube 10 may be of such length as to resonate at the modulation frequency of heat energy received. Variations in light from manometric flame 11 are impressed on photoelectric cell 12, the anode of which is connected to a battery 14, the cathode thereof being connected to the grid of vacuum tube amplifier 15. Acetylene gas as is well known gives off much of its energy in the form of light when a flame thereof is properly regulated. This is due to the incandescent particles of carbon formed in the flame as the carbon and hydrogen comprising the acetylene gas decompose. For this reason I prefer the use of acetylene gas where manometric flames are used. Furthermore acetylene gas is an unstable gas and in the process of evaporation from adsorbent in container 5 upon the application of radiant energy, has a tendency to decompose into carbon and hydrogen with the release of additional energy in heat sensitive element 5. Its heat of evaporation per molecule is of the order of the amount of energy contained in a photon of seven microns wavelength. I therefore regard the use of acetylene in a heat responsive device as a novel feature of my invention.

The load of photoelectric cell 12 consists of a diode 16, having its anode connected to the cathode 12, and its cathode connected to the negative terminal of battery 14. The cathode of 16 is heated by an auxiliary circuit comprising triode 17, having its anode connected through milliameter 18 to positive terminal of battery 14. The cathode of triode 17 is heated by the usual A battery 19, and is connected through a gas discharge device 20, cathode of 16 to negative terminal of battery 14. The amount of current which may flow through cathode 16 is regulated by the potential impressed on the grid of triode 17 by the voltage drop across resistance 21 in parallel with condenser 22, the temperature of the cathode of diode 16 being so regulated that the A. C. internal empedance of 16 is always extremely high regardless of slow variations in magnitude of space current through photoelectric cell 12, as will later be explained. The purpose of gas discharge device 20 is to impress a negative potential on the grid of triode 17 to counteract the otherwise excessive positive potential impressed thereon by resistance 21.

The anode of amplifier 15 is connected to the cathode of vacuum tube amplifier 23, the grid of tube 23 is connected to biasing battery 24 to tend to impress a positive potential thereon to counteract the effect of the normal anode to cathode drop of tube 15, which being common to the input and output circuit of tube 23 places a negative potential thereon.

Similarly anode of tube 23 is connected to cathode of tube 25, the grid of which is connected to the positive terminal of battery 24.

The anode of vacuum tube choke 26 is connected to positive terminal of battery 14, resistance 27 being common to the input and output circuit of tube 26, the negative terminal of resistance 27 being connected to anode of tube 25. The grid of tube 26 is connected to the positive terminal of battery 14, through a high resistance, and is connected to the anode of tube 25 by resistance 29 in parallel with condenser 30. The resistances 28 and 29 act as a potentiometer to tend to impress a positive potential on the grid of tube 26 to counteract the otherwise excessive negative D. C. potential across resistance 27, and tends to render the average anode to cathode voltage drop across tube 26 constant regardless of the magnitude of the steady component of the space current flowing through tube 26, and resistance 27. This latter factor is important since the grid of vacuum tube amplifier 31 is connected through voltage dropping resistance 39 to the cathode of tube 26, and it is of course essential that the control grid of tube 31 be maintained at the proper bias, regardless of large variations of slow periodicity in current flowing in vacuum tube amplifier stage comprising tube 26, resistance 27, tubes 25, 23, 15, resistance 21, and battery 14. The functioning of such a stage of amplification is described and claimed in U. S. Patent No. 1,886,386, issued to me Nov. 8, 1932, to which reference is made.

The control grid of tube 31 is connected to the anode of grid leak tube 32. The grid of this latter tube is connected to the negative terminal of battery 14 resistance 33 being common to the input and output circuit of tube 32. The negative terminal of resistance 33 is connected to the negative terminal of biasing battery 34 to render the bias on control grid of tube 31 optimum.

The usual positive voltage is impressed on the screen grid of tube 31. Resistance 35 in parallel with condenser 36 assists in keeping the bias on tube 31 at the normal negative voltage.

In the output circuit of tube 31 is placed milliammeter 37 and electro-responsive devive 38, in the form of headphones.

The functioning of the circuit is as follows: Valve 4 is opened until flame 11 has increased to the desired size. A sudden increase of radiant energy impressed on heat responsive device 5 produces an instantaneous evaporation of molecules of gas adsorbed on adsorbent particles 8, producing a compressional wave through tube 10, with resultant instantaneous increase in size of flame 11. The increase of light from 11 produces a surge of current from battery 14, anode to cathode of photoelectric cell 12, anode to cathode of diode 16. As this diode was adjusted to the point where it was already operating close to saturation, it has a high A. C. impedance to this surge, tending to place an instantaneous positive potential on control grid of tube 15, and counteracting the negative potential impressed thereon by resistance 21.

This causes a surge of current in the stage comprising battery 14, choke tube 26, resistance 27, amplifier tubes 25, 23, 15 and condenser 22. This produces a similar decrease in current in circuit comprising battery 14, anode to cathode of tube 26, resistance 39, grid leak tube 32, resistance 33, C battery 34. As grid leak tube 32 has an extremely high impedance to A. C. this places a high negative potential on amplifier 31, with similar decrease in output current through milliammeter 37 and responsive device 38.

If, however, heat responsive element 5, is subject to a gradual increase in radiant energy, resulting in an increase in size of flame 11, for a considerable length of time, the photoelectric cell circuit will not respond thereto. This is due to the fact that the steady increased positive potential impressed on grid of tube 15, produces a steady increase in current through resistance 21, which in turn impresses a more positive potential on the grid of tube 17, resulting in its increased space current flowing through the cathode of tube 16, heating the cathode of tube 16, lowering its anode to cathode impedance, which in turn results in a more negative potential being impressed on control grid of tube 15.

I have found it possible by this method to compensate for wide variations in total light striking photoelectric cell 12, and still maintain an A. C. load for cell 12 sufficiently high to render the circuit highly sensitive to instantaneous fluctuations in light from flame 11, due to small instantaneous changes in radiant energy striking heat sensitive element 5.

Figure 2:
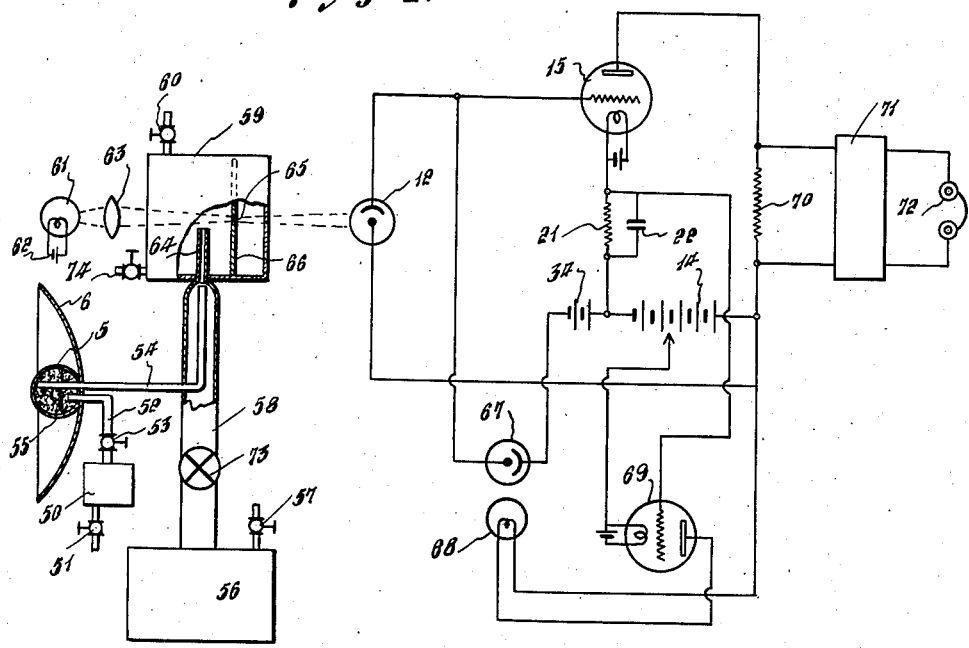
Fig. 2 is a modification thereof wherein variations in the infra red radiant energy modulated gas stream is used to produce auxiliary variations in a smoke stream, which in turn modulate a photoelectric beam.

Fig. 2 is a modification of Fig. 1, wherein container 50 is filled with a gas such as hydrogen, acetylene or similar gas, valve 51 being provided to replenish it from time to time. Tube 52 connects container 50 to heat sensitive element 5, valve 53 being provided to regulate the flow of gas therethrough. In heat sensitive element 5, there are finely divided particles 55 of an adsorbent such as spongy rhodium, platinum, palladium or the like if hydrogen gas is used, which freely give off the gas when radiant heat is impressed upon them. If acetylene gas is used charcoal particles saturated with acetone are preferable.

Tube 54 connects heat sensitive element 5 into tube 58, to the vicinity of jet 64. Container 56 is filled at a pressure above atmospheric pressure with a finely divided smoke such as white phosphorus, commonly used in military operations for screening troop movements. Valve 57 is supplied to replenish the supply of smoke. Valve 73 regulates the flow of this smoke in tube 58 out jet 64 at optimum rate. Container 59 is of glass or other material transparent to light through lens 63, from electric light 61, the filament of which is heated by battery 62. The container 59 prevents wind currents from effecting the flow of smoke from jet 64, valves 60 and 74 being provided to exhaust smoke accumulating therein from time to time. Opaque diaphragm 66 has an opening 65 therein, whereby the beam of light from 61 may pass to photoelectric cell 12.

The amplifier circuit of Fig. 2 is similar to that of Fig. 1. The load of photoelectric cell 12 consists of a second photoelectric cell 67, the D. C. impedance of said latter cell being controlled by light received from electric light 68. The light given off by 68 depends on the space current of triode 69, which in turn depends on the voltage drop across resistance 21, condenser 22, which are in the input and output circuit of tube 15 as explained for Fig. 1. The cathode of tube 69 is connected to battery 14 at a point to place the proper bias on grid of tube 69. Resistance 70 is connected as load in the output circuit of tube 15. Voltage variations across 70 are amplified by amplifier 71 and appear in electro-responsive device 72.

In operation, valves 53 and 73 are opened to permit optimum release of smoke and gas from jet 64. When an instantaneous pulse of radiant energy is impressed on heat sensitive element 5, a compressional wave is set up which caused an instantaneous increased release of smoke from jet 64, which produces an instantaneous decrease in light from light 61 striking photoelectric cell 12. As photoelectric cell 67 has been passing a saturation current, this produces an instantaneous negative voltage on grid of tube 15, with similar amplified pulse in electro-responsive device 72.

If however heat sensitive element 5 is subject to a steady increased radiation, a steady decrease in light from 61 will strike photoelectric cell 12. This will produce a decrease in the steady current passing through resistance 21, with a more negative potential being impressed on the grid of tube 69, with a decrease in its space current flowing through light 68, and resultant increase in D. C. impedance of photoelectric cell 67 which results in an increase of steady positive bias on grid of tube 15. Slow variations in light striking photoelectric cell 12 will therefore not effect responsive device 72.

Figure 3:
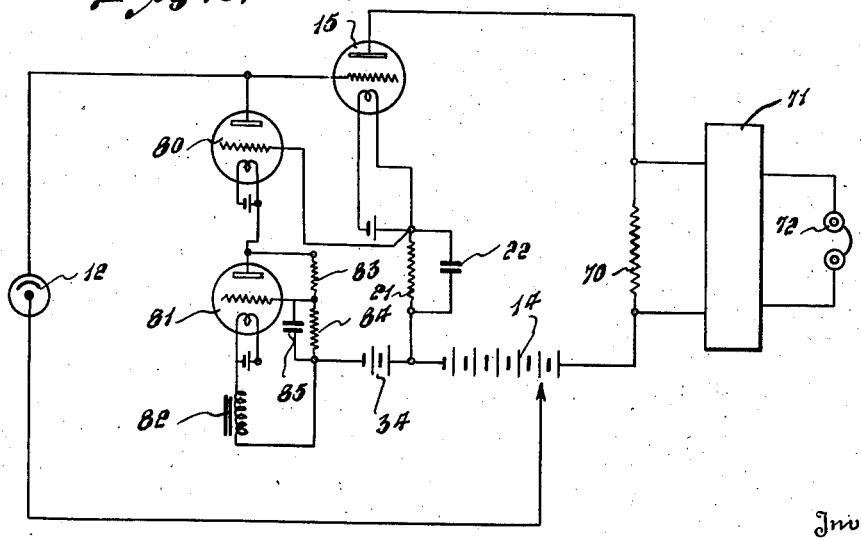
Fig. 3 illustrates a modification of my high impedance saturated electron emitting element load.

Fig. 3, illustrates a further form of high impedance load for photoelectric cell. In this circuit the load for photoelectric cell 12 consists of vacuum tubes 80, 81, and inductance 82. Inductance 82 is connected in the common plate and grid circuit of tube 81. The plate impedance of 81 and the inductance 82 are connected in the common plate and grid circuit of tube 80.

A variable bias is impressed on the grid of tube 81 similar to that illustrated and described for vacuum tube 26 of Fig. 1. It consists of a high resistance 83 connecting the plate and grid of tube 81, and a resistance 84 in parallel with condenser 85 connecting the grid of tube 81 to its filament through choke impedance 82.

The grid of tube 80 is also provided with variable bias source, consisting of the parallel connection of resistance 21 and condenser 22.

A surge of current from cell 12 meets with the inductive impedance 82, which produces an increased inductive impedance in the plate impedance of tube 81, which in turn produces an increased inductive impedance in the plate impedance of tube 80.

If cell 12 is irradiated with a steady light of increased magnitude, the D. C. plate impedance of tube 81 is maintained low by the increased positive voltage impressed thereon by the voltage drop across resistance 84. The magnitude of the D. C. plate impedance of tube 80 is also maintained low by the increased voltage drop across resistance 21.

Therefore sudden surges in current from cell 12 will be amplified and appear in responsive device 72, where slow changes of current from cell 12 will have very little effect on device 72. As in Figures 1 and 2 the A. C. load of photoelectric cell 12 has been maintained high.

Numerous variations in gases and adsorbents are possible. For example the use of hydrochloric acid for saturation of cotton 9 of Fig. 1 in place of acetone described gave marked increase in sensitivity over the use of acetone. The disadvantages of the use of HCl were that heat sensitive element 5 was subject to early deterioration, whereas when acetone was used device 5 maintained its efficiency for months. Furthermore, there was a tendency for ignition of gases in container 5 with HCl, or even a mild explosion.

Another variation which readily suggests itself is the release of a gas of low molecular heat of vaporization, such as hydrogen of Fig. 2, passing through heat sensitive element 5 (the heat of evaporation of the hydrogen molecule being the amount of energy contained in a photon of 125 microns wavelength), of using the compressional wave set up in the hydrogen gas stream to create a compressional wave in a stream of acetylene, which might be placed in container 56, burning the acetylene in manometric flame at jet 64, to produce variations in light to be impressed on photoelectric cell 12.

Another variation in Fig. 2 might be the producing of a manometric flame by the release of hydrogen at jet 64, thereby rendering the particles of white phosphorus smoke emitted from jet 64 incandescent and applying light from said incandescent particles to photoelectric cell 12.

Numerous methods of measuring variations in gas pressure are known. Various methods of measuring the rate of flow of a gas through a tube have been devised. Of particular note is the method of rendering the molecules of a gas radio active and indicating the radio activity at a remote point in the tube, such as the method illustrated in U. S. Patent No. 1,808,709, to Blake. Application of known methods of measuring variations in gas pressure in heat responsive element 5 fall within the scope of my invention. It is therefore not desired to limit my invention to the means described. My invention is to be limited only by prior art and as defined in the following claims.

What is claimed is:

1. A radiant energy responsive device comprising: a source of acetylene gas, an adsorbent comprising finely divided charcoal particles, acetone adsorbed on said particles, a cellophane container for said adsorbent, a manometric flame, means for passing a current of said acetylene gas over said adsorbent to said flame, means for focusing radiant energy on said adsorbent to vary the light emitted from said flame as the magnitude of said radiant energy varies, means for impressing said light on a photoelectric cell, a diode load operating at space current saturation for said cell, means for producing an electrical current varying in magnitude with the magnitude of said light and passing said electrical current through the cathode of said diode to vary the magnitude of said space current saturation, a vacuum tube amplifier having an input and an output circuit, means for applying voltage variations across said load to said input circuit, a load in said output circuit, said load comprising a vacuum tube having an anode, a cathode, and a control electrode, said anode being connected to said control electrode through a high resistance, said control electrode being connected to said cathode by a second resistance in parallel with a condenser, and a third resistance, said anode, said cathode, and said third resistance being common to said output circuit, a second vacuum tube amplifier having a plate, a grid, and a filament, said grid being connected to said cathode by a voltage dropping resistance, a grid leak tube having an anode, a cathode, and a control electrode, said anode of said grid leak tube being connected to said grid, said cathode of said grid leak tube being connected to said filament through a fourth resistance, said fourth resistance being common to the circuit of said anode and said control electrode of said grid leak tube, an electro-responsive device, and means for connecting said device in said plate circuit of said second amplifier.

2. An infra red photon responsive device comprising: a container, an adsorbent in said container, acetylene gas adsorbed on said adsorbent, means for impressing infra red photons on said adsorbent to vary the pressure of acetylene gas in said container, and means for indicating the pressure of said gas in said container.

3. An infra red responsive device comprising: a container partially constructed of Cellophane, an adsorbent in said container, a gas adsorbed on said adsorbent, means for impressing infra red photons through said Cellophane onto said adsorbent to vary the gas pressure in said container, and means for indicating the gas pressure in said container.

4. An infra red responsive device comprising: a Cellophane container, an adsorbent in said container, a source of acetylene gas, means for passing a current of said gas over said adsorbent, means for focussing infra red photons through said Cellophane container onto said adsorbent to vary the magnitude of said current of said gas, and means for indicating the magnitude of said current.

5. An infra red responsive device comprising: a source of acetylene gas, an infra red transparent container, an adsorbent in said container, a manometric flame, means for passing a current of acetylene over said adsorbent to vary the magnitude of said flame, a photoelectric cell, means for impressing light from said flame onto said cell, and means for indicating the current flowing through said cell.

6. An infra red responsive device comprising: a source of acetylene gas, an adsorbent, hydrochloric acid adsorbed on said adsorbent, means for impressing radiant energy on said adsorbent, means for passing a current of said gas over said adsorbent, and means for indicating the magnitude of said current.

7. An infra red responsive device comprising: a source of acetylene gas, an adsorbent, a halogen compound adsorbed on said adsorbent, means for passing a current of said gas over said adsorbent, means for impressing infra red photons on said adsorbent, and means for indicating the magnitude of said current.

8. An infra red responsive device comprising: a source of gas, a container, an adsorbent in said container, a manometric flame, a tube for passing a current of said gas over said adsorbent to said flame, means for impressing a modulated beam of infra red photons on said adsorbent to vary the magnitude of said flame, said tube being of such length as to resonate at the modulation frequency of said beam, a photoelectric cell, means for impressing light energy from said flame on said cell, an electron emitting load for said cell, means for producing an electrical current varying in magnitude with the magnitude of light impressed on said cell, means for varying the electron emission of said load with said current, an electroresponsive device and means for controlling said device by voltage variations across said load.

9. An infra red responsive device comprising: a source of gas, a container, an adsorbent in said container, means for passing a current of said gas over said adsorbent, means for impressing infra red photons on said adsorbent to vary the magnitude of said current, a source of light, a photoelectric cell, means for impressing light energy from said source of light on said cell, means for varying the magnitude of said impressed light with said gas current, an electron emitting load for said cell, means for producing an electrical current varying in magnitude with the magnitude of light impressed on said cell, and varying the impedance of said load with said electrical current, and means for indicating voltage variations across said load.

10. In a radiant energy responsive device, a photoelectric cell, means for applying radiant energy to said cell, a load for said cell, a vacuum tube amplifier having an input and output circuit, means for applying voltage variations across said load to said input circuit, a vacuum tube choke connected in said output circuit, said last tube having an anode, a cathode, and a control electrode, a high resistance connecting said anode to said control electrode, a second resistance shunted by a condenser and in series with a third resistance connecting said control electrode and said cathode, said anode, said cathode and said third resistance being common to said output circuit, a second vacuum tube amplifier having a plate, grid, and filament, a voltage dropping resistance connecting said cathode and said grid, a vacuum tube grid leak connecting said grid and said filament, said grid leak tube having an anode, a cathode, and a control electrode, said grid being connected to said anode of said grid leak tube, said cathode of said grid leak tube being connected to said filament by a resistance, said last resistance being common to the circuit of said anode and said control electrode of said grid leak tube, and a load connected in the plate circuit of said second amplifier.

11. An infra red responsive device comprising: a source of gas, an adsorbent, means for passing a current of said gas over said adsorbent, means for applying radiant energy to said adsorbent to produce variations in said gas current, a light source, a photoelectric cell, means for impressing a beam of light from said light source on said cell, a source of smoke, means for passing a stream of said smoke through said beam to vary the intensity of said beam impressed on said cell, means for applying said current of said gas to said smoke stream to vary the magnitude of said stream, and means for indicating the magnitude of said light beam impressed on said cell.

12. A heat responsive device comprising: a source of gas, an adsorbent, means for passing a current of said gas over said adsorbent, means for applying heat to said adsorbent to vary said gas current, means for producing a stream of smoke, means for applying said gas current to said stream of smoke to produce variations in said stream and means for indicating variations in said smoke stream.

13. The method of indicating the magnitude of infra red photons being received which consists in, varying the magnitude of a gas current with said photons, in varying the magnitude of a smoke stream with said gas current, in varying the magnitude of a light beam with said smoke stream, and in indicating the magnitude of said light beam.

14. The method of maintaining a high alternating current impedance of an electron emitting load of a photoelectric cell, said cell being subject to large variations in light of slow periodicity, which consists in generating an electric current varying in magnitude with the envelope of said light, in producing photons with said electric current, and applying said photons to said load to vary the electron emission of said load.

15. An infra red responsive device comprising: a source of acetylene gas, a Cellophane container, an adsorbent in said container, means for passing a current of said gas over said adsorbent, means for producing a stream of smoke, means for impressing infra red photons on said adsorbent to produce variations in said gas current, means for applying said gas current to said smoke stream to produce variations in said stream similar to said variations in said gas stream, a photoelectric cell, means for impressing visible photons on said cell, means for varying the magnitude of said visible photons impressed on said cell, by said smoke variations, an electron emissive load for said photoelectric cell, means for producing an electrical current varying in magnitude with said visible photons, means for controlling the electron emission of said load with said electrical current and means for indicating voltage variations across said load.

16. The method of indicating the presence of far infra red photons, with a plurality of streams of different gases, said gases having different heats of molecular vaporization, which consists in evaporating molecules of a first of said gases having a low heat of molecular vaporization, to produce compressional waves in a first of said streams, and applying said first stream to a second of said streams of said gases, having a higher molecular heat of vaporization to produce compressional waves in said second stream, in producing variations in light with said compressional waves set up in said second stream, and in indicating said variations in light.

17. An infra red responsive device comprising: a source of gas, a container, an asorbent in said container, means for passing a current of said gas over said adsorbent, means for impressing infra red photons on said adsorbent to produce variations in said gas current, means for producing variations in light with said variations in said gas current, a photoelectric cell, means for impressing said variations in said light on said cell, a saturated electron emissive load for said cell, means for indicating voltage variations across said load, and means for rendering voltage variations across said load substantially independent of variations in said light of large magnitude and slow periodicity, said last means comprising means for producing an electrical current varying in magnitude with the magnitude of said light, and controlling the saturation value of said load with said electrical current.

18. In a device for indicating variations in infra red radiations of a predetermined periodicity, means for producing variations in light varying in magnitude with the magnitude of said radiations, a translating device responsive to said variations in said light, and means for rendering said translating device virtually non-responsive to variations in said light of slower periodicity than said predetermined periodicity.

19. In a device for receiving variations in infra red radiations of predetermined periodicity, means for producing a light varying in magnitude with the magnitude of said radiations, a photoelectric cell, a saturated electron emissive load for said cell, means for impressing said light on said cell to produce voltage variations across said load, means for rendering voltage variations across said load substantially independent of variations in said light of slower periodicity than said predetermined periodicity, said last means comprising means for producing an electrical current varying in magnitude with the magnitude of said light and in varying the electron emission of said load with said current.

20. A device for receiving infra red radiations of predetermined periodicity comprising: a container, an adsorbent in said container, a gas adsorbed on said adsorbent, means for applying said radiations to said adsorbent to release said gas from said adsorbent, means for producing variations of light varying in magnitude with the magnitude of said gas released, a photoelectric cell, a saturated electron emissive load for said cell, means for applying said light to said cell to produce voltage variations across said load, means for rendering voltage variations across said load virtually independent of variations of slower periodicity than said predetermined periodicity, said last means comprising means for producing an electrical current varying in magnitude with the magnitude of said light variations and means for varying the saturation electron emissive value of said load with said electrical current.

21. The method of indicating the presence of infra red photons with a plurality of gases, which consists in producing compressional waves in a stream of a first of said gases with said photons, in producing compressional waves in a second of said gases with said compressional waves in said first gas, in producing variations in light with said waves produced in said second of said gases, and in indicating said variations in said light.

22. Apparatus for detecting compressional waves comprising: means for producing variations in light with said compressional waves, a photoelectric cell, means for impressing said light on said cell, a load for said cell, means for varying the impedance of said load inversely in accordance with the magnitude of light illuminating said cell, and means for indicating voltage variations across said load.

OLIVER T. FRANCIS.